United States Patent
Boyd et al.

(10) Patent No.: US 7,707,465 B2
(45) Date of Patent: Apr. 27, 2010

(54) ROUTING OF SHARED I/O FABRIC ERROR MESSAGES IN A MULTI-HOST ENVIRONMENT TO A MASTER CONTROL ROOT NODE

(75) Inventors: William T. Boyd, Poughkeepsie, NY (US); Douglas M. Freimuth, New York, NY (US); William G. Holland, Cary, NC (US); Steven W. Hunter, Raleigh, NC (US); Renato J. Recio, Austin, TX (US); Steven M. Thurber, Austin, TX (US); Madeline Vega, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1128 days.

(21) Appl. No.: 11/340,447

(22) Filed: Jan. 26, 2006

(65) Prior Publication Data

US 2007/0174733 A1 Jul. 26, 2007

(51) Int. Cl.
*G06F 11/00* (2006.01)
(52) U.S. Cl. .......................................... 714/57; 714/56
(58) Field of Classification Search .................. 714/56, 714/57
See application file for complete search history.

(56) References Cited

U.S. PATENT DOCUMENTS

| | | | |
|---|---|---|---|
| 5,257,353 | A | 10/1993 | Blanck et al. |
| 5,367,695 | A | 11/1994 | Narad et al. |
| 5,392,328 | A | 2/1995 | Schmidt et al. |
| 5,960,213 | A | 9/1999 | Wilson |
| 5,968,189 | A | 10/1999 | Desnoyers et al. |
| 6,061,753 | A | 5/2000 | Ericson |
| 6,662,251 | B2 * | 12/2003 | Brock et al. ................ 710/110 |
| 6,691,184 | B2 | 2/2004 | Odenwald et al. |
| 6,769,021 | B1 * | 7/2004 | Bradley ....................... 709/220 |
| 6,775,750 | B2 | 8/2004 | Krueger |
| 6,813,653 | B2 | 11/2004 | Avery |
| 6,907,510 | B2 | 6/2005 | Bennett et al. |
| 7,036,122 | B2 | 4/2006 | Bennett et al. |
| 7,096,305 | B2 | 8/2006 | Moll |

(Continued)

FOREIGN PATENT DOCUMENTS

WO 2006089914 A1 8/2006

OTHER PUBLICATIONS

U.S. Appl. No. 11/066,424, filed Feb. 25, 2005, Arndt et al.

(Continued)

*Primary Examiner*—Joshua A Lohn
(74) *Attorney, Agent, or Firm*—Yee & Associates, P.C.; Libby Z. Toub (57) ABSTRACT

A computer-implemented method, apparatus, and computer program product are disclosed for routing error messages in a multiple host computer system environment to only those host computer systems that are affected by the error. The environment includes multiple host computer systems that share multiple devices utilizing a switched fabric. An error is detected in one of the devices. Routing tables that are stored in fabric devices in the fabric are used to identify ones of the host computer systems that are affected by the error. An error message that identifies the error is routed to only the identified ones of the host computer systems.

18 Claims, 8 Drawing Sheets

U.S. PATENT DOCUMENTS

| | | |
|---|---|---|
| 7,103,064 B2 | 9/2006 | Petty et al. |
| 7,134,052 B2 | 11/2006 | Bailey et al. |
| 7,152,180 B2* | 12/2006 | Shoaib et al. ................... 714/4 |
| 7,174,413 B2 | 2/2007 | Pettey et al. |
| 7,188,209 B2 | 3/2007 | Pettey et al. |
| 7,194,538 B1 | 3/2007 | Rabe et al. |
| 7,363,389 B2 | 4/2008 | Collins et al. |
| 7,398,337 B2 | 7/2008 | Arndt et al. |
| 7,474,623 B2* | 1/2009 | Boyd et al. ................... 370/242 |
| 2002/0068559 A1* | 6/2002 | Sharma et al. ............... 455/423 |
| 2002/0144001 A1 | 10/2002 | Collins et al. |
| 2002/0161937 A1 | 10/2002 | Odenwald et al. |
| 2002/0188701 A1 | 12/2002 | Brown et al. |
| 2003/0120852 A1* | 6/2003 | McConnell et al. ......... 710/316 |
| 2003/0221030 A1 | 11/2003 | Pontius et al. |
| 2004/0015622 A1 | 1/2004 | Avery |
| 2004/0025166 A1 | 2/2004 | Adlung et al. |
| 2004/0039986 A1 | 2/2004 | Solomon et al. |
| 2004/0123014 A1 | 6/2004 | Schaefer et al. |
| 2004/0172494 A1 | 9/2004 | Pettey et al. |
| 2004/0179534 A1 | 9/2004 | Pettey et al. |
| 2004/0210754 A1 | 10/2004 | Barron et al. |
| 2004/0230709 A1* | 11/2004 | Moll ............................. 710/1 |
| 2004/0230735 A1 | 11/2004 | Moll |
| 2004/0230861 A1* | 11/2004 | Bailey et al. ................... 714/6 |
| 2005/0025119 A1 | 2/2005 | Pettey et al. |
| 2005/0044301 A1 | 2/2005 | Vasilevsky et al. |
| 2005/0102682 A1 | 5/2005 | Shah et al. |
| 2005/0147117 A1* | 7/2005 | Pettey et al. ................. 370/463 |
| 2005/0188116 A1 | 8/2005 | Brown et al. |
| 2005/0228531 A1* | 10/2005 | Genovker et al. ........... 700/130 |
| 2005/0270988 A1 | 12/2005 | DeHaemer |
| 2006/0168361 A1 | 7/2006 | Brown et al. |
| 2006/0179195 A1 | 8/2006 | Sharma et al. |
| 2006/0184711 A1 | 8/2006 | Pettey et al. |
| 2006/0195617 A1 | 8/2006 | Arndt et al. |
| 2006/0195675 A1 | 8/2006 | Arndt et al. |
| 2006/0206655 A1 | 9/2006 | Chappell et al. |
| 2006/0206936 A1 | 9/2006 | Liang et al. |
| 2006/0212608 A1 | 9/2006 | Arndt et al. |
| 2006/0212620 A1 | 9/2006 | Arndt et al. |
| 2006/0212870 A1 | 9/2006 | Arndt et al. |
| 2006/0230181 A1 | 10/2006 | Riley |
| 2006/0230217 A1 | 10/2006 | Moll |
| 2006/0239287 A1 | 10/2006 | Johnsen et al. |
| 2006/0242333 A1 | 10/2006 | Johnsen et al. |
| 2006/0242352 A1* | 10/2006 | Torudbakken et al. ....... 710/312 |
| 2006/0242354 A1 | 10/2006 | Johnsen et al. |
| 2006/0253619 A1 | 11/2006 | Torudbakken et al. |
| 2006/0271718 A1* | 11/2006 | DiPlacido et al. ........... 710/263 |
| 2007/0027952 A1* | 2/2007 | Boyd et al. .................. 709/204 |
| 2007/0097950 A1 | 5/2007 | Boyd et al. |
| 2007/0136458 A1 | 6/2007 | Boyd et al. |

OTHER PUBLICATIONS

U.S. Appl. No. 11/066,645, filed Feb. 25, 2005, Arndt et al.
U.S. Appl. No. 11/065,869, filed Feb. 25, 2005, Arndt et al.
U.S. Appl. No. 11/065,951, filed Feb. 25, 2005, Arndt et al.
U.S. Appl. No. 11/066,201, filed Feb. 25, 2005, Arndt et al.
U.S. Appl. No. 11/065,818, filed Feb. 25, 2005, Arndt et al.
U.S. Appl. No. 11/066,518, filed Feb. 25, 2005, Arndt et al.
U.S. Appl. No. 11/066,096, filed Feb. 25, 2005, Arndt et al.
U.S. Appl. No. 11/065,823, filed Feb. 25, 2005, Arndt et al.
U.S. Appl. No. 11/054,274, filed Feb. 9, 2005, Flood et al.
U.S. Appl. No. 11/055,850, filed Feb. 11, 2005, Bishop et al.
U.S. Appl. No. 11/054,889, filed Feb. 10, 2005, Frey et al.
U.S. Appl. No. 11/054,871, filed Feb. 10, 2005, Griswell et al.
U.S. Appl. No. 11/055,831, filed Feb. 11, 2005, Bishop et al.
U.S. Appl. No. 11/056,691, filed Feb. 11, 2005, Le et al.
U.S. Appl. No. 11/056,878, filed Feb. 12, 2005, Bishop et al.
U.S. Appl. No. 11/056,692, filed Feb. 11, 2005, Floyd et al.
U.S. Appl. No. 11/049,342, filed Feb. 2, 2005, Lloyd et al.
U.S. Appl. No. 11/053,529, filed Feb. 8, 2005, Flood et al.
U.S. Appl. No. 11/140,648, filed May 27, 2005, Mack et al.
U.S. Appl. No. 11/260,610, filed Oct. 27, 2005, Boyd et al.
U.S. Appl. No. 11/260,618, filed Oct. 27, 2005, Boyd et al.
U.S. Appl. No. 11/260,619, filed Oct. 27, 2005, Boyd et al.
U.S. Appl. No. 11/191,626, filed Jul. 28, 2008, Boyd et al.
U.S. Appl. No. 11/260,624, filed Oct. 27, 2005, Boyd et al.
U.S. Appl. No. 11/176,922, filed Jul. 7, 2005, Boyd et al.
U.S. Appl. No. 11/348,903, filed Feb. 7, 2006, Boyd et al.
U.S. Appl. No. 11/334,678, filed Jan. 18, 2006, Body et al.
U.S. Appl. No. 11/351,020, filed Feb. 9, 2006, Boyd et al.
U.S. Appl. No. 11/567,411, filed Dec. 6, 2006, Boyd et al.
U.S. Appl. No. 11/567,425, filed Dec. 6, 2006, Boyd et al.

\* cited by examiner

ROUTING OF SHARED I/O FABRIC ERROR MESSAGES IN A MULTI-HOST ENVIRONMENT TO A MASTER CONTROL ROOT NODE

BACKGROUND OF THE INVENTION

1. Field of the Invention

The present invention relates generally to data processing systems and more particularly to communications in a data processing system including multiple host computer systems and multiple adapters where the host computer systems share the multiple adapters and communicate with those adapters through a PCI switched-fabric bus. Still more specifically, the present invention relates to a computer-implemented method, apparatus, and computer usable program code for reporting an error that occurred in a device to a single master control host node that waits until all traffic in the paths in the fabric that might be affected by the error is suspended and all host nodes that might be affected by the error have acknowledged the receipt of a notice that the error occurred before clearing the error.

2. Description of the Related Art

A conventional PCI bus is a local parallel bus that permits expansion cards to be installed within a single computer system, such as a personal computer. PCI-compliant adapter cards can then be coupled to the PCI bus in order to add input/output (I/O) devices, such as disk drives or other devices, to the computer system. A PCI bridge/controller is needed in order to connect the PCI bus to the system bus of the computer system. The PCI bus can communicate, through the PCI bridge/controller with the CPU of the computer system in which the PCI bus is installed. Several PCI bridges may exist within a single computer system. However, these PCI bridges serve to couple multiple PCI buses to the CPU of the computer system in which the PCI buses are installed. If the single computer system includes multiple CPUs, the PCI buses can be utilized by the multiple CPUs of the single computer system.

A PCI Express (PCI-E) bus is a modification of the standard PCI Computer bus. PCI-E is based on higher speed serial communications. PCI-E is also architected specifically with a tree structured I/O interconnect topology in mind with a Root Complex (RC) denoting the root of an I/O hierarchy that connects a host computer system subsystem to the I/O.

PCI-E provides a migration path compatible with the PCI software environment. In addition to offering superior bandwidth, performance, and scalability in both bus width and bus frequency, PCI Express offers other advanced features. These features include QoS (quality of service), aggressive power management, native hot-plug, bandwidth per pin efficiency, error reporting, recovery and correction and innovative form factors, and meet the growing demands for sophisticated capabilities such as peer-to-peer transfers and dynamic reconfiguration. PCI Express also enables low-cost design of products via low pin counts and wires. A linearly scaled 16-lane PCI Express interconnect can provide data transfer rates of more than 8 Gigabytes per second.

The host computer system typically has a PCI-to-Host bridging function commonly known as the root complex. The root complex bridges between a CPU bus, such as hyper-transport, and the PCI bus. Other functions may be performed in the root complex like address translation, if necessary. Multiple host computer systems containing one or more root functions are referred to as a multi-root system. Multi-root configurations which share I/O fabrics have not been addressed well in the past.

Today, PCI-E buses do not permit sharing of PCI adapters among multiple separate computer systems. Known I/O adapters that comply with the PCI-E standard or a secondary network standard, such as Fibre Channel, InfiniBand, or Ethernet, are typically integrated into blades and server computer systems and are dedicated to the blade or system in which they are integrated. Having dedicated adapters adds to the cost of each system because an adapter is rather expensive. Further, the inability to share an adapter among various host computer systems has contributed to the slow adoption rate of these technologies.

In addition to the cost issue, there are physical space concerns in a blade system. There is a constraint in space that is available in a blade for adapters.

Multi-root I/O network configurations which share I/O fabrics have not been addressed well in the past. In known systems, when an error is detected, that error is reported to all host nodes. Thus, errors detected in an I/O fabric will generally bring down all of the host nodes that may be using that fabric.

Some errors affect all host nodes and should be reported to all of the hosts. For example, if a switch fails then all nodes should be notified. Other types of errors, though, affect only one or more particular host nodes but not all hosts. For example, if an adapter stops functioning, each host node that utilizes the adapter should be notified.

In known systems, all errors are reported to all host nodes regardless of whether the error affects one host node or all host nodes because there is no method for routing the reporting of errors to only the host nodes that might be affected by the error.

Therefore, a need exists for a method, apparatus, and computer program product for reporting an error that occurred in a device, also referred to herein as a component, to a single master control host computer system that waits until all traffic in the paths in the fabric that might be affected by the error is suspended and all host computer systems that might be affected by the error have acknowledged the receipt of a notice that the error occurred before the master control node clears the error where the error message is routed to only those host computer systems that might be affected by the error.

SUMMARY OF THE INVENTION

The illustrative embodiment of the present invention is a method, apparatus, and product for defining to the I/O fabric which host nodes and I/O fabric devices might be affected by a particular error and for routing error messages to only those host nodes that might be affected by the error in a multi-root environment.

A computer-implemented method, apparatus, and computer program product are disclosed for routing error messages in a multiple host computer system environment to only those host computer systems that are affected by the error. The environment includes multiple host computer systems that share multiple devices utilizing a switched fabric. An error is detected in one of the devices. Routing tables that are stored in fabric devices in the fabric are used to identify ones of the host computer systems that are affected by the error. An error message that identifies the error is routed to only the identified ones of the host computer systems.

Specifically, the illustrative embodiment of the present invention is directed to a method, apparatus, and product for directing PCI Express I/O fabric error messages to the appropriate fabric devices and host computer systems for processing.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The illustrative embodiment of the present invention applies to any general or special purpose computing system where multiple host computer systems share a pool of I/O adapters (IOAs) through a common I/O fabric. In a preferred embodiment, the fabric is a collection of devices that conform to the PCI Express standard.

In the illustrative embodiment of the present invention, the I/O fabric is attached to more than one host computer system such that multiple different host computer systems can share the I/O adapters with other host computer systems. Errors that are detected by one of the adapters that is coupled to the I/O fabric are routed to the affected host computer systems and to a master control root node. One of the host computer systems acts as the master control root node.

According to the illustrative embodiment of the present invention, the fabric reports all adapter errors to a master control node and to all other host computer systems and other fabric devices that might be affected by the error. The master control node and other host nodes then suspend their transmissions through the affected fabric. The master control node waits until all affected host computer systems report that they have seen the error before the master control node permits the host computer systems to resume I/O operations through the affected fabric devices.

Figure 1:
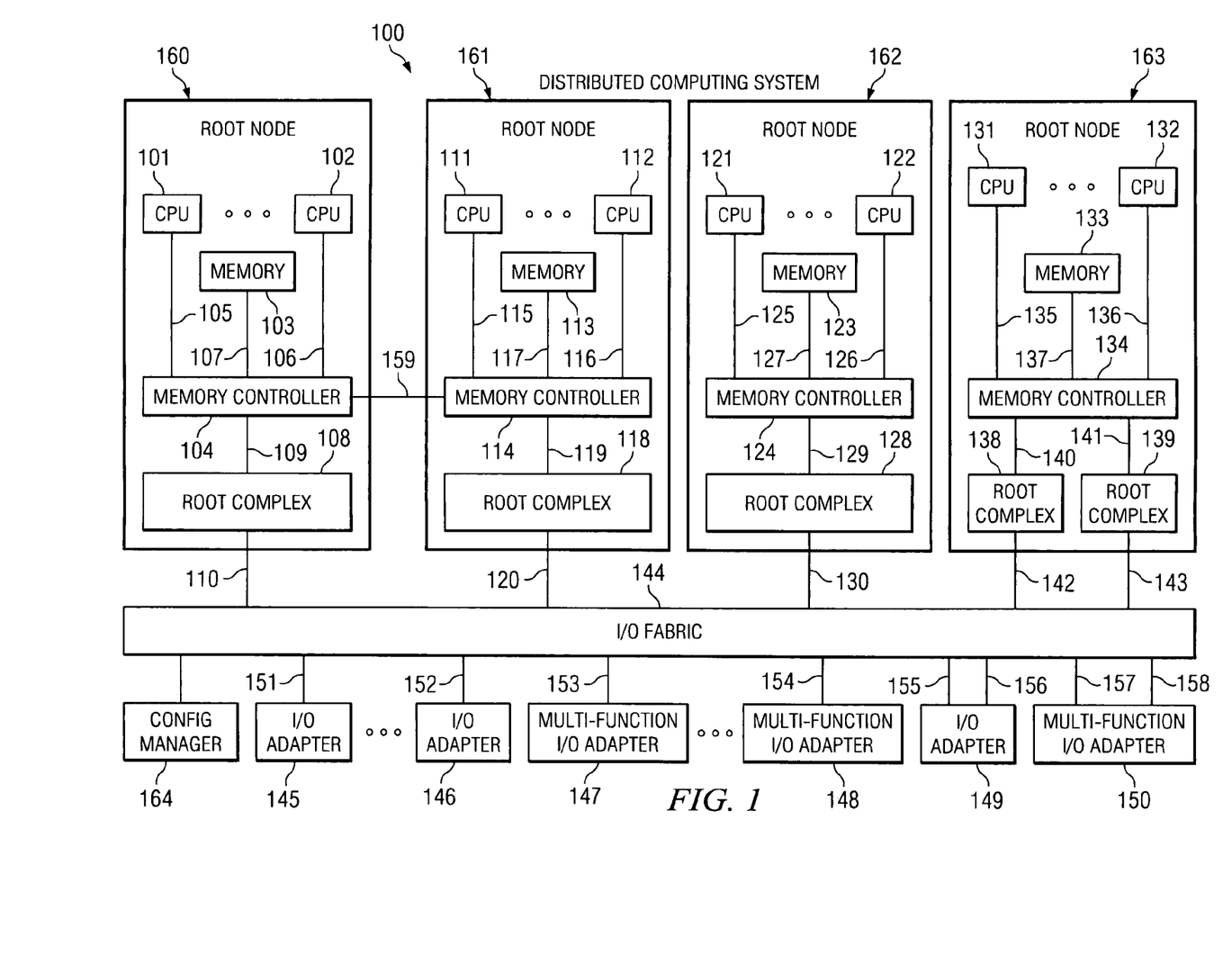
FIG. 1 is a diagram of a distributed computer system illustrated in accordance with a preferred embodiment of the illustrative embodiment of the present invention.

With reference now to the figures and in particular with reference to FIG. 1, a diagram of a distributed computing system 100 is illustrated in accordance with a preferred embodiment of the illustrative embodiment of the present invention. The distributed computer system represented in FIG. 1 takes the form of two or more root complexes (RCs) 108, 118, 128, 138, and 139, attached to an I/O fabric 144 through I/O links 110, 120, 130, 142, and 143, and to the memory controllers 104, 114, 124, and 134 of the root nodes (RNs) 160-163. A root complex denotes the root of an I/O hierarchy that connects a host computer system subsystem to the I/O. A root complex is included within a root node. A root node is a complete computer system, such as a server computer system. A root node is also referred to herein as a host node.

The I/O fabric is attached to the IOAs 145-150 through links 151-158. The IOAs may be single function IOAs as in 145-146 and 149, or multiple function IOAs as in 147-148 and 150. Further, the IOAs may be connected to the I/O fabric via single links as in 145-148 or with multiple links for redundancy as in 149-150.

The RCs 108, 118, 128, 138, and 139 are part of an RN 160-163. There may be more than one RC per RN as in RN 163. In addition to the RCs, each RN consists of one or more Central Processing Units (CPUs) 101-102, 111-112, 121-122, 131-132, memory 103, 113, 123, and 133, a memory controller 104, 114, 124, and 134 which connects the CPUs, memory, and I/O RCs and performs such functions as handling the coherency traffic for the memory.

RNs may be connected together 159 at their memory controllers to form one coherency domain and which may act as a single Symmetric Multi-Processing (SMP) system, or may be independent nodes with separate coherency domains as in RNs 162-163.

Configuration manager 164 may be attached separately to the I/O fabric 144 or may be part of one of the RNs 160-163. The configuration manager configures the shared resources of the I/O fabric and assigns resources to the RNs.

Distributed computing system 100 may be implemented using various commercially available computer systems. For example, distributed computing system 100 may be implemented using an IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the illustrative embodiment of the present invention.

Figure 2:
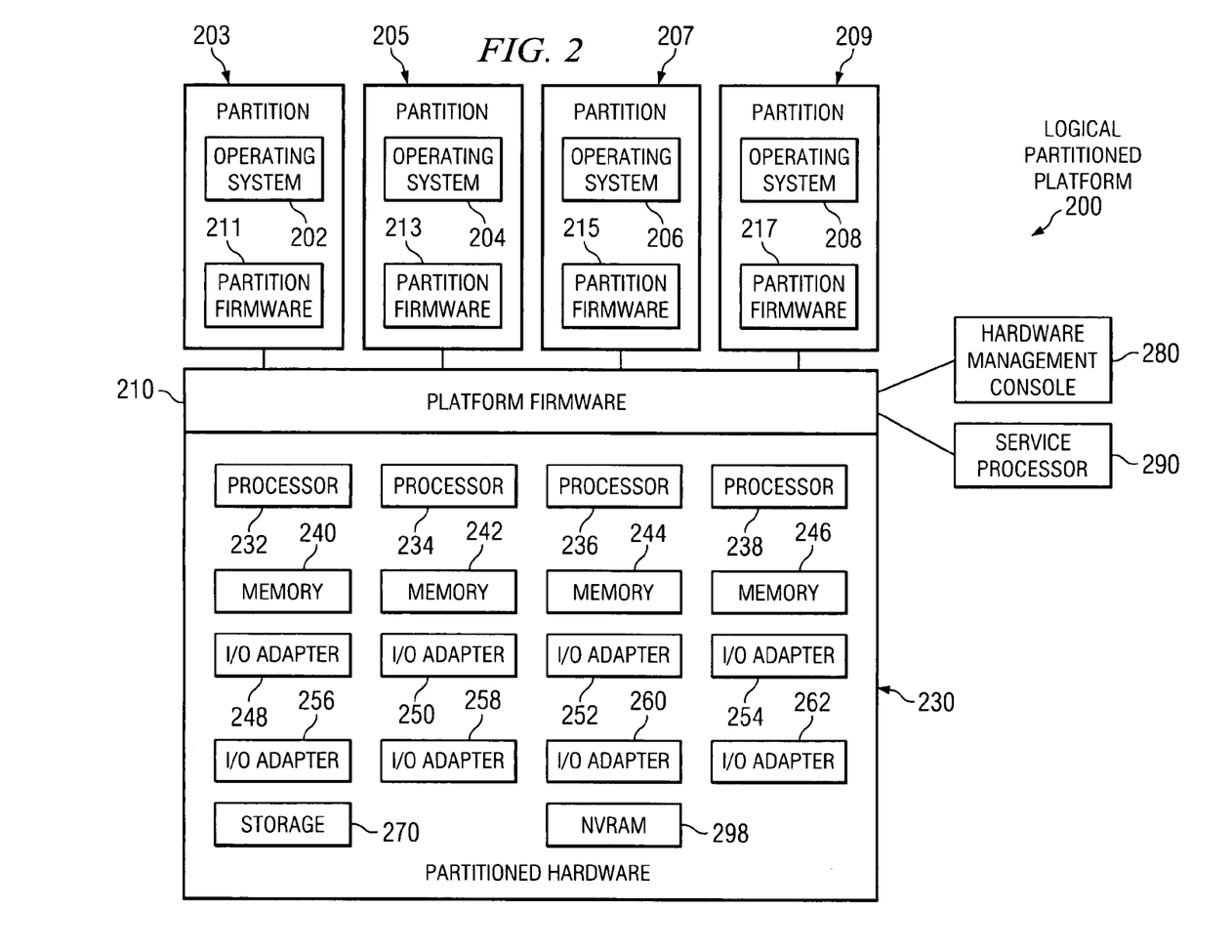
FIG. 2 is a block diagram of an exemplary logically partitioned platform in which the illustrative embodiment of the present invention may be implemented.

With reference now to FIG. 2, a block diagram of an exemplary logically partitioned platform is depicted in which the illustrative embodiment of the present invention may be implemented. The hardware in logical partitioned platform 200 may be implemented as, for example, distributed computing system 100 in FIG. 1. Logically partitioned platform 200 includes partitioned hardware 230, operating systems 202, 204, 206, 208, and partition management firmware 210.

Operating systems 202, 204, 206, and 208 may be multiple copies of a single operating system or multiple heterogeneous operating systems simultaneously run on logically partitioned platform 200. These operating systems may be implemented using OS/400, which are designed to interface with a partition management firmware, such as Hypervisor 210. OS/400 is used only as an example in these illustrative embodiments. Other types of operating systems, such as AIX and Linux, may also be used depending on the particular implementation. Operating systems 202, 204, 206, and 208 are located in partitions 203, 205, 207, and 209. Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes a plurality of processors 232-238, a plurality of system memory units 240-246, a plurality of IOAs 248-262, and a storage unit 270. Each of the processors 232-238, memory units 240-246, NVRAM storage 298, and IOAs 248-262, or parts thereof, may be partitioned to one of multiple partitions within logical partitioned platform 200 by being assigned to one of the partitions, each of the partitioned resources then corresponding to one of operating systems 202, 204, 206, and 208.

Partition management firmware 210 performs a number of functions and services for partitions 203, 205, 207, and 209 to create and enforce the partitioning of logically partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate distributed computing system from which a system administrator may perform various functions including reallocation of resources to different partitions. In a logically partitioned (LPAR) environment, it is not permissible for resources or programs in one partition to affect operations in another partition. Furthermore, to be useful, the assignment of resources needs to be fine-grained.

Figure 3:
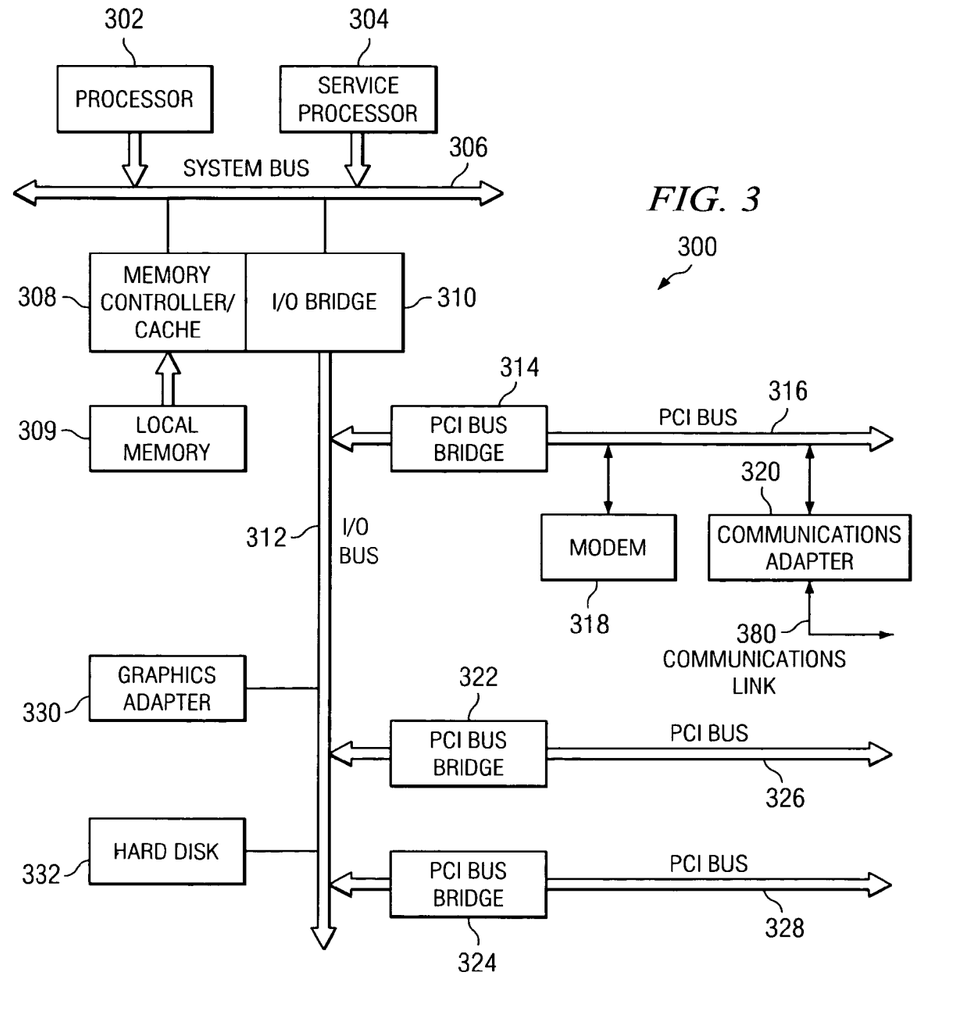
FIG. 3 is a block diagram of a data processing system used to implement any of the data processing systems depicted herein in accordance with the illustrative embodiment of the present invention.

FIG. 3 is a block diagram of a data processing system that may be used to implement any of the data processing systems depicted herein in accordance with the illustrative embodiment of the present invention. Data processing system 300 may be a symmetric multiprocessor (SMP) system including a plurality of processors 302 and 304 connected to system bus 306. Alternatively, a single processor system may be employed. In the depicted example, processor 304 is a service processor. Also connected to system bus 306 is memory controller/cache 308, which provides an interface to local memory 309. I/O bus bridge 310 is connected to system bus 306 and provides an interface to I/O bus 312. Memory controller/cache 308 and I/O bus bridge 310 may be integrated as depicted.

A conventional peripheral component interconnect (PCI) bus bridge 314 connected to I/O bus 312 provides an interface to a conventional PCI local bus 316. A number of I/O adapters, such as modem 318 may be connected to PCI bus 316. Typical PCI bus implementations will support four PCI expansion slots or add-in connectors. Communications links to other computers may be provided through modem 318 and communications adapter 320. Communications adapter 320 enables data processing system 300 to send and receive messages from another computer system via a communication link 380.

Additional PCI bus bridges 322 and 324 provide interfaces for additional PCI buses 326 and 328, from which additional modems or network adapters may be supported. In this manner, data processing system 300 allows connections to multiple network computers. A memory-mapped graphics adapter 330 and hard disk 332 may also be connected to I/O bus 312 as depicted, either directly or indirectly.

Figure 4:
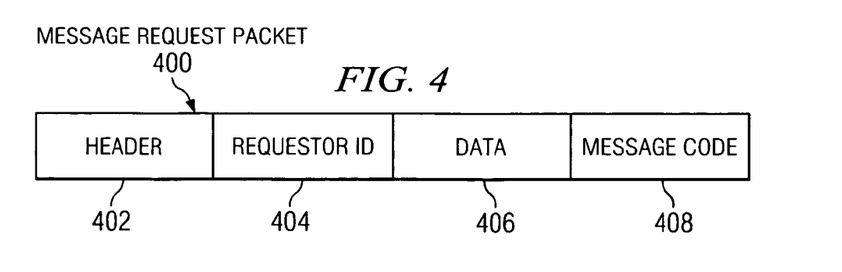
FIG. 4 illustrates a block diagram of the general layout of a message request packet used to report an error in accordance with the illustrative embodiment of the present invention.

FIG. 4 illustrates a block diagram of the general layout of a message request packet used to report an error in accordance with the illustrative embodiment of the present invention. Message request packet 400 includes a header field 402, a requester identifier (ID) field 404, a data field 406, and a message code field 408. Message request packet 400 is used to transmit a notice that an error has occurred. Message request packet 400 is also referred to herein as an error message. Message request packet 400 is an error message-packet used to transmit error messages.

A requester ID is included in requester ID field 404. The requester ID identifies the device in which the error occurred. Message codes are stored in message code field 408. Message codes include information about the particular error that has occurred.

Figure 5:
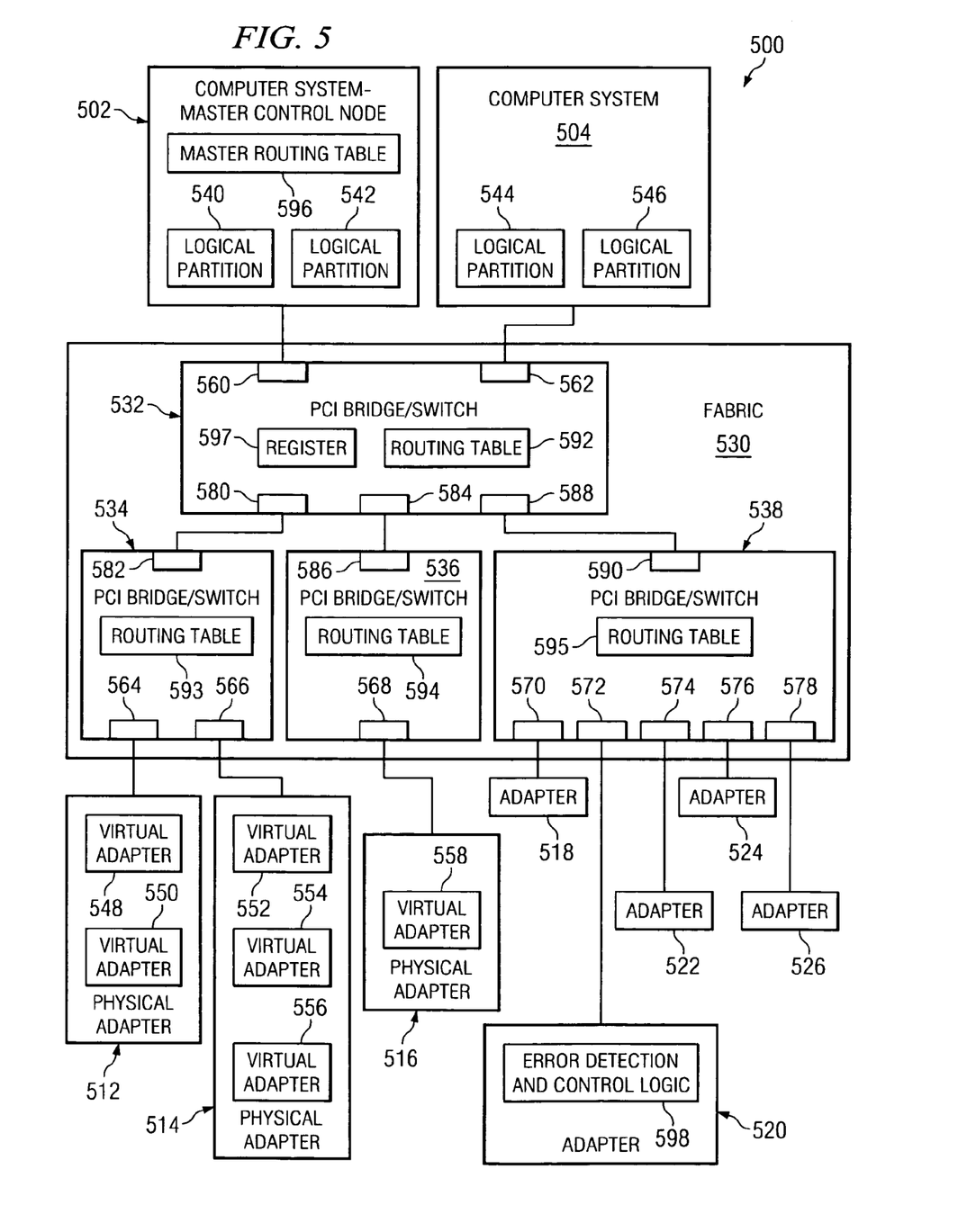
FIG. 5 illustrates a data processing environment in which computer systems are coupled to adapters, such as I/O adapters, utilizing a fabric of PCI switches that includes only one PCI root switch in accordance with the illustrative embodiment of the present invention.

FIG. 5 illustrates a data processing environment in which computer systems are coupled to adapters, such as I/O adapters, utilizing a fabric of PCI switches that includes only one PCI root switch in accordance with the illustrative embodiment of the present invention. Data processing environment 500 includes computer systems 502 and 504. A computer system is also referred to herein as a host node. Thus, computer system 502 may also be referred to herein as host node 502.

Computer systems 502-504 utilize physical adapters 512, 514, 516, 518, 520, 522, 524, and 526. Computer systems 502-504 and physical adapters 512-526 communicate with each other via fabric 530. Fabric 530 includes multiple PCI bridge/switches, such as PCI bridges/switches 532, 534, 536, and 538. Fabric 530 is a fabric of devices that conform to the PCI-E standard. PCI switch 532 is a PCI root switch, while PCI switches 534, 536, and 538 are not PCI root switches. A PCI switch is a PCI root switch when that PCI switch is connected directly to a host node, such as one of computer systems 502 or 504.

Each computer system may be logically partitioned, such as depicted by FIG. 2. For example, computer system 502 includes logical partition 540 and logical partition 542. Computer system 504 includes logical partition 544 and logical partition 546.

Each physical adapter may be virtualized such that one physical adapter appears to be multiple, separate, and independent adapters. For example, physical adapter 512 appears to be two separate virtual adapters 548 and 550. Physical adapter 514 appears to be three separate virtual adapters 552, 554, and 556. Physical adapter 516 appears to be virtual adapter 558.

Each computer system and physical adapter is coupled to fabric 530 by being coupled to a port in one of the PCI switches. Computer system 502 is coupled to port 560 in PCI switch 532. Computer system 504 is coupled to port 562 in PCI switch 532. Physical adapter 512 is coupled to port 564 in PCI switch 534. Physical adapter 514 is coupled to port 566 in PCI switch 534. Physical adapter 516 is coupled to port 568 in PCI switch 536. Physical adapter 518 is coupled to port 570 in PCI switch 538. Physical adapter 520 is coupled to port 572 in PCI switch 538. Physical adapter 522 is coupled to port 574 in PCI switch 538. Physical adapter 524 is coupled to port 576 in PCI switch 538. Physical adapter 526 is coupled to port 578 in PCI switch 538.

Each PCI switch may be coupled to another PCI switch within fabric 530. For example, port 580 in PCI switch 532 is coupled to port 582 in PCI switch 534. Port 584 in PCI switch 532 is coupled to port 586 in PCI switch 536. Port 588 in PCI switch 532 is coupled to port 590 in PCI switch 538.

A routing table is included in each PCI switch. Routing table 592 is included in PCI switch 532. Routing table 593 is included in PCI switch 534. Routing table 594 is included in PCI switch 536. Routing table 595 is included in PCI switch 538.

A master routing table 596 is generated and stored in master control node 502. Master routing table 596 is the combination of routing tables 592-595 and includes the contents of all of routing tables 592-595. Each adapter includes its own error detection and control logic. For example, adapter 520 includes error detection and control logic 598. Although error detection and control logic is only depicted in one adapter, it is present, though not shown, in every adapter.

The PCI root switch, PCI switch 532 in FIG. 5, includes a register 597. Register 597 includes a bit for each host node. Since there are only two host nodes in the depicted example, register 597 will include two host node bits. Each bit is associated with a different one of the host nodes. Thus, a first bit in register 597 is associated with computer system 502, and a second bit in register 597 is associated with computer system 504.

The following describes an example of reporting an error when that error has occurred within an adapter, i.e. when an adapter has failed. The method, apparatus, and computer program product described herein may also be used for reporting errors when the error occurred within any component within the system where a component includes an adapter, a bridge, a switch, or any other device.

As an example of the illustrative embodiment of the present invention, error detection and control logic 598 detects an error within adapter 520. Error detection and control logic 598 then generates a message request packet, of the format depicted in 400, into which it puts the requester ID that identifies the adapter in which the error occurred. In this case, the requester ID identifies adapter 520. This message request packet is the error message that will be used to notify the hosts that an error has occurred within adapter 520.

The requester ID is setup by the configuration code at fabric initialization time, and is the bus number, device number, and function number of the device, in this case adapter 520, for PCI Express. The message request packet 400 is then passed through the fabric 530 until it reaches the first PCI switch, i.e., PCI switch 538. PCI switch 538 includes routing table 595.

The message request packet 400 is first passed from adapter 520 to PCI Switch 538. PCI switch 538 identifies the requester by determining what requester ID is stored in the message request packet it received. PCI switch 538 then uses routing table 595 to look up that requester's entry.

Those knowledgeable in the art will recognize that the search of the correct entry in the routing table may be performed in any number of ways. Additionally, the routing table may be any type data structure where information is stored. For example, a content addressable memory, a scan of the table for a value of the requestor ID field in the table equal to the requester ID in the error message, the use of the requester ID in the error message as an index into the routing table, and so on.

PCI switch 538 determines from its routing table that for adapter 520, which is identified in the requester ID field of the packet, a bit is set for intermediate port 588. PCI switch 538 then forwards the message request packet to intermediate port 588.

PCI switch 532 then receives this message request packet from its port 588. PCI switch 532 uses its routing table 592 to determine which root ports and which intermediate ports are identified by looking up the requester that is identified in the packet. PCI switch 532 determines from its routing table that for adapter 520, which is identified in the requester ID field of the packet, bits for root (host) ports 560 and 562 are set and no bits are set for intermediate ports. PCI switch 532 then forwards the message request packet to root ports 560 and 562. Computer system 502 then will receive a message request packet from PCI root switch 532. Computer system 504 also will receive a message request packet from PCI root switch 532.

Computer system 502 is the master control node. All fabric errors are reported to the master control node. Thus, computer system 502 will receive a message request packet from PCI root switch 532 that indicates that an error has occurred in adapter 520. Computer system 502, then determines which path or paths are affected by the reported error. Computer system 502 makes this determination by examining a master routing table that is stored in computer system 502. Information about the topology of the entire fabric, as well as the topology of the hosts and adapters connected to the fabric, is stored in master routing table 502. Computer system 502 uses the topology information to identify which paths through fabric 530 are affected by the error. In the depicted example where an error occurred in adapter 520, the affected path includes PCI switch 538 and PCI switch 532. Hosts 502 and 504 are also identified as being affected by the error.

Each affected computer system will be notified about the error when the computer system receives the message packet that indicates that an error has occurred in a particular adapter. When a computer system receives such a message packet, the computer system will suspend its traffic to the particular adapter. This computer system is then responsible for acknowledging the error by notifying the master control node that this computer system is aware of the error and has suspended its traffic to the particular adapter. The computer system will then wait until the error is cleared before the computer system begins transmitting traffic again to the particular adapter.

The master control node will wait until each affected host computer system has acknowledged the error before the master control node clears the error. Each root PCI switch includes a register in which a bit is allocated for each host computer system. A computer system acknowledges its receipt of an error message by setting its associated bit in this register. The master control node can then poll the register to determine whether a particular host computer system has acknowledged the receipt of an error.

After all affected computer systems have acknowledged the receipt of an error, the master control node will clear the bits in the register. The master control node indicates to a computer system that the error has been cleared by clearing the computer system's bit in the register. After a computer system has set its bit in the register to indicate that the computer system has received the error message, the computer system will continue to poll the register to determine whether that computer system's bit is still set. When a computer system's bit is cleared, the computer system is notified that it may again start transmitting traffic to the particular adapter.

When computer system 502 receives the message request packet, computer system 502 will suspend its traffic through the failing component, which in this case is adapter 520. When computer system 502 receives the message request packet, computer system 502 will poll register 597 to determine if the bit for computer system 504 has been set. Computer system 502 will continue to poll register 597 until computer system 502 determines that the bit for computer system 504 has been set. When the bit for computer system 504 has been set, computer system 502 will clear the bits of register 597. At this time, computer system 502 will then resume transmitting traffic to adapter 520, if possible.

Concurrently with the process described above that occurs when computer system 502 receives the error message, when computer system 504 receives the message packet, computer system 504 will suspend its traffic to adapter 520. Computer system 504 then sets a bit in register 597. The bit that computer system 504 sets is the bit that is associated with computer system 504. When this bit is set, it indicates that computer system 504 has received a notice of an error, i.e. it has received the message request packet. When the bit is cleared, it indicates that computer system 504 has not received a notice of an error. Computer system 504 then polls register 597 to determine if the bit that is associated with computer system 504 is still set. While the bit is set, computer system 504 continues to suspend its traffic to adapter 520 and poll the register. When the bit becomes cleared, computer system 504 will resume transmitting traffic to adapter 520.

Figure 6:
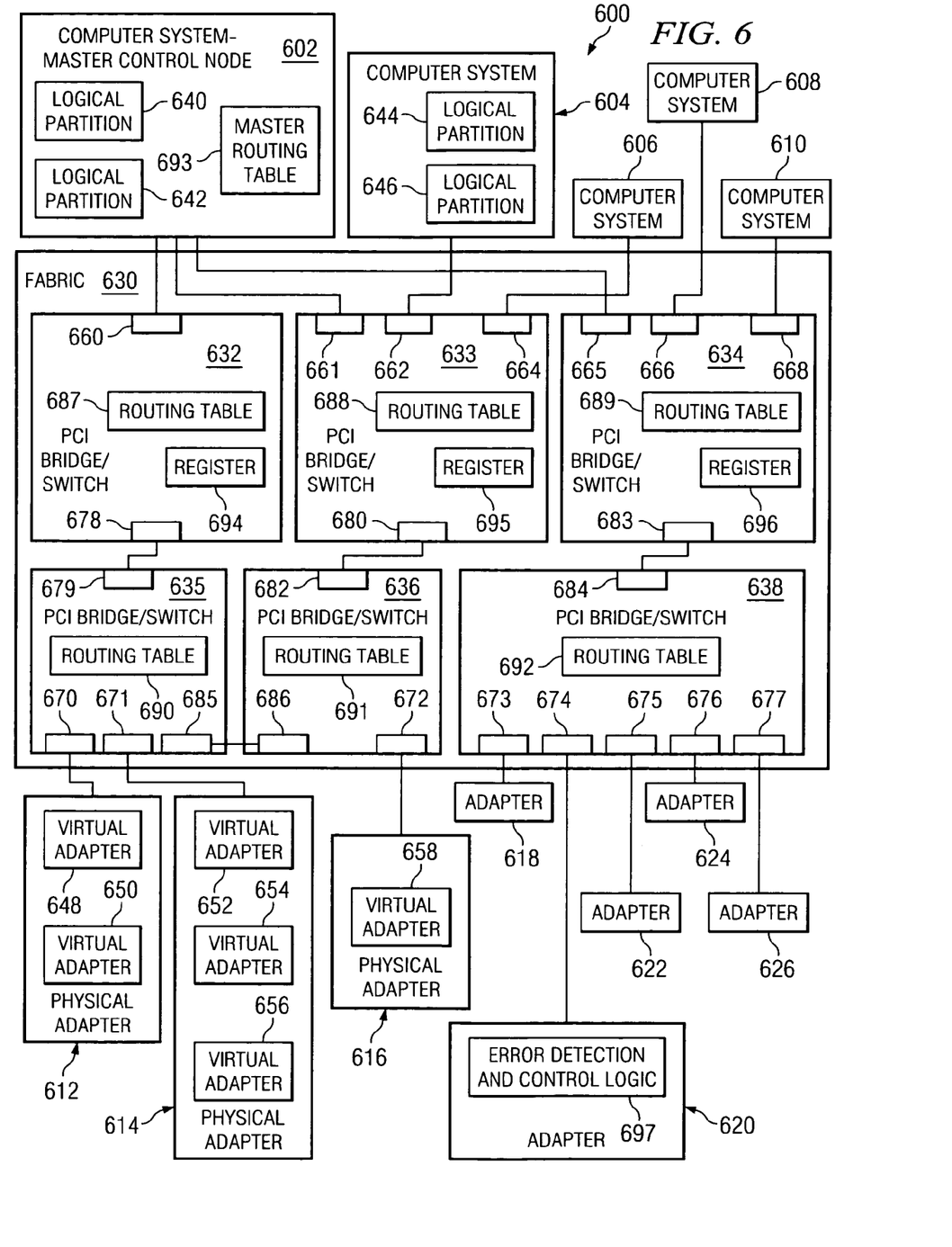
FIG. 6 illustrates a data processing environment in which computer systems are coupled to adapters, such as I/O adapters, utilizing a fabric of PCI switches that includes multiple PCI root switches in accordance with the illustrative embodiment of the present invention.

FIG. 6 illustrates a data processing environment in which computer systems are coupled to adapters, such as I/O adapters, utilizing a fabric of PCI switches that includes multiple PCI root switches in accordance with the illustrative embodiment of the present invention. Data processing environment 600 includes computer systems 602, 604, 606, 608, and 610. Computer systems 602-610 utilize physical adapters 612, 614, 616, 618, 620, 622, 624, and 626. Computer systems 602-610 and physical adapters 612-626 communicate with each other via fabric 630. Fabric 630 includes multiple PCI bridge/switches, such as PCI bridges/switches 632, 633, 634, 635, 636, and 638. PCI switches 632, 633, and 634 are PCI root switches, while PCI switches 635, 636, and 638 are not PCI root switches. A PCI switch is a PCI root switch when that PCI switch is connected directly to a host node, such as one of computer systems 602-610.

Each computer system may be logically partitioned, such as depicted by FIG. 2. For example, computer system 602 includes logical partition 640 and logical partition 642. Computer system 604 includes logical partition 644 and logical partition 646.

Each physical adapter may be virtualized such that one physical adapter appears to be multiple, separate, and independent adapters. For example, physical adapter 612 appears to be two separate virtual adapters 648 and 650. Physical adapter 614 appears to be three separate virtual adapters 652, 654, and 656. Physical adapter 616 appears to be virtual adapter 658.

Each computer system and physical adapter is coupled to fabric 630 by being coupled to a port in one of the PCI switches. Computer system 602 is coupled to port 660 in PCI switch 632, port 661 in switch 633, and port 665 in switch 634. Computer system 604 is coupled to port 662 in PCI switch 633. Computer system 606 is coupled to port 664 in PCI switch 633. Computer system 608 is coupled to port 666 in PCI switch 634. Computer system 610 is coupled to port 668 in PCI switch 634.

Physical adapter 612 is coupled to port 670 in PCI switch 635. Physical adapter 614 is coupled to port 671 in PCI switch 635. Physical adapter 616 is coupled to port 672 in PCI switch 636. Physical adapter 618 is coupled to port 673 in PCI switch 638. Physical adapter 620 is coupled to port 674 in PCI switch 638. Physical adapter 622 is coupled to port 675 in PCI switch 638. Physical adapter 624 is coupled to port 676 in PCI switch 638. Physical adapter 626 is coupled to port 677 in PCI switch 638.

Each PCI switch may be coupled to another PCI switch within fabric 630. For example, port 678 in PCI switch 632 is coupled to port 679 in PCI switch 635. Port 680 in PCI switch 633 is coupled to port 682 in PCI switch 636. Port 683 in PCI switch 634 is coupled to port 684 in PCI switch 638. Port 685 in PCI switch 635 is coupled to port 686 in PCI switch 636.

A routing table is included in each PCI switch. Routing table 687 is included in PCI switch 632. Routing table 688 is included in PCI switch 633. Routing table 689 is included in PCI switch 634. Routing table 690 is included in PCI switch 635. Routing table 691 is included in PCI switch 636. Routing table 692 is included in PCI switch 638.

Master control node 602 generates and stores a master routing table 693 in master control node 602. Master routing table 693 includes the combination of routing tables 687-692.

PCI switches 632-634 in FIG. 6 are PCI root switches. Therefore, each PCI switch includes a register. PCI switch 632 includes a register 694. PCI switch 633 includes a register 695. PCI switch 634 includes a register 696.

Each one of these registers includes a bit for each host node. Thus, each register will include a first bit that is associated with master control node 602, a second bit that is associated with computer system 604, a third bit that is associated with computer system 606, a fourth bit that is associated with computer system 608, and a fifth bit that is associated with computer system 610. Since there are five host nodes, registers 687-689 will each include five host node bits. Each bit is associated with a different one of the host nodes.

Each adapter includes error detection and control logic. For example, adapter 620 includes error detection and control logic 696.

As an example of the illustrative embodiment of the present invention, error detection and control logic 696 detects an error within adapter 620. Error detection and control logic 696 then generates a message request packet 400 into which it puts the requester ID that identifies adapter 620. This message request packet is the error message that will be used to notify each host node that an error has occurred within adapter 620. The message request packet 400 is then passed through the fabric 630 until it reaches the first PCI switch, i.e., PCI switch 638.

PCI switch 638 identifies the requester by determining what requester ID is stored in the message request packet. PCI switch 638 then uses routing table 692 to look up that requester's entry in table 692. PCI switch 638 determines from its routing table that for adapter 620, which is identified in the requester ID field of the packet, a bit is set for intermediate port 683. PCI switch 638 then forwards the message request packet to intermediate port 683.

PCI switch 634 then receives this message request packet from its port 683. PCI switch 634 uses its routing table 689 to determine which root ports and which intermediate ports are identified by looking up the requester that is identified in the packet. PCI switch 634 determines from its routing table that for adapter 620, which is identified in the requester ID field of the packet, bits for root (host) ports 602, 666, and 668 are set and no bits are set for intermediate ports. PCI switch 634 then forwards the message request packet to root ports 602, 666, and 668.

Computer systems 602, 608, and 610 each receives a message request packet from PCI root switch 634. When computer system 608 receives the message packet, computer system 608 will suspend its traffic to adapter 620. Computer system 608 then sets a bit in register 696. The bit that computer system 608 sets is the bit that is associated with computer system 608. When this bit is set, it indicates that computer system 608 has received a notice of an error, i.e. a message request packet. When the bit is cleared, it indicates that computer system 608 has not received a notice of an error. Computer system 608 then polls register 696 to determine if the bit that is associated with computer system 608 is set. While the bit is set, computer system 608 continues to suspend its traffic to adapter 620 and poll the register. When the bit is cleared, computer system 608 will resume transmitting traffic to adapter 620.

When computer system 610 receives the message request packet, computer system 610 will suspend its traffic to adapter 620. Computer system 610 then sets a bit in register 696. The bit that computer system 610 sets is the bit that is associated with computer system 610. When this bit is set, it indicates that computer system 610 has received a notice of an error. When the bit is cleared, it indicates that computer system 610 has not received a notice of an error. Computer system 610 then polls register 696 to determine if the bit that is associated with computer system 610 is set. While the bit is set, computer system 610 continues to suspend its traffic to adapter 620 and poll the register. When the bit is cleared, computer system 610 will resume transmitting traffic to adapter 620.

Computer system 602 then polls register 696 to determine if the bits for computer systems 608 and 610 have been set. Computer system 602 will continue to poll register 696 until computer system 602 determines that the bits for computer systems 608 and 610 have been set. When the bits for computer systems 608 and 610 have been set, computer system 602 will clear the bits of register 696. At this time, computer systems 608 and 610 will then resume transmitting traffic to adapter 620.

Figure 7:
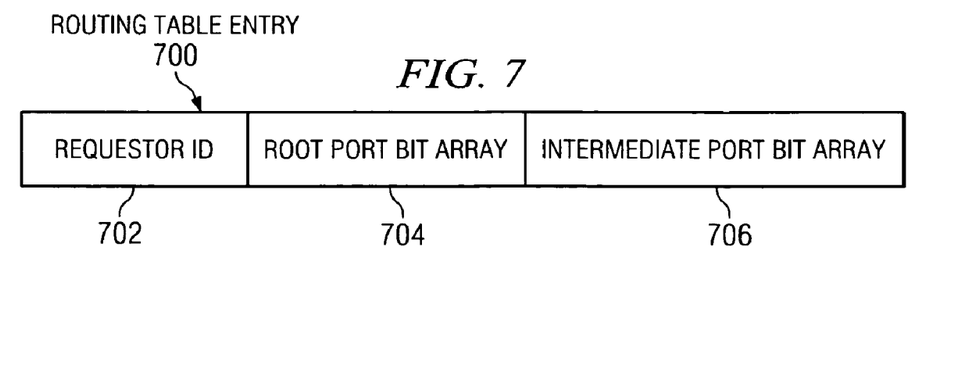
FIG. 7 depicts a routing table entry in accordance with the illustrative embodiment of the present invention.

FIG. 7 depicts a routing table entry 700 in accordance with the illustrative embodiment of the present invention. Entry 700 includes a requester identifier (ID) 702 which identifies the device in which the error occurred. Entry 700 also includes a root port bit array 704. Each bit in array 704 corresponds to a root port to which the message request packet needs to be routed. Entry 700 includes an intermediate port bit array 706. Each bit in array 706 corresponds to an intermediate port to which the message request packet needs to be routed.

Figure 8:
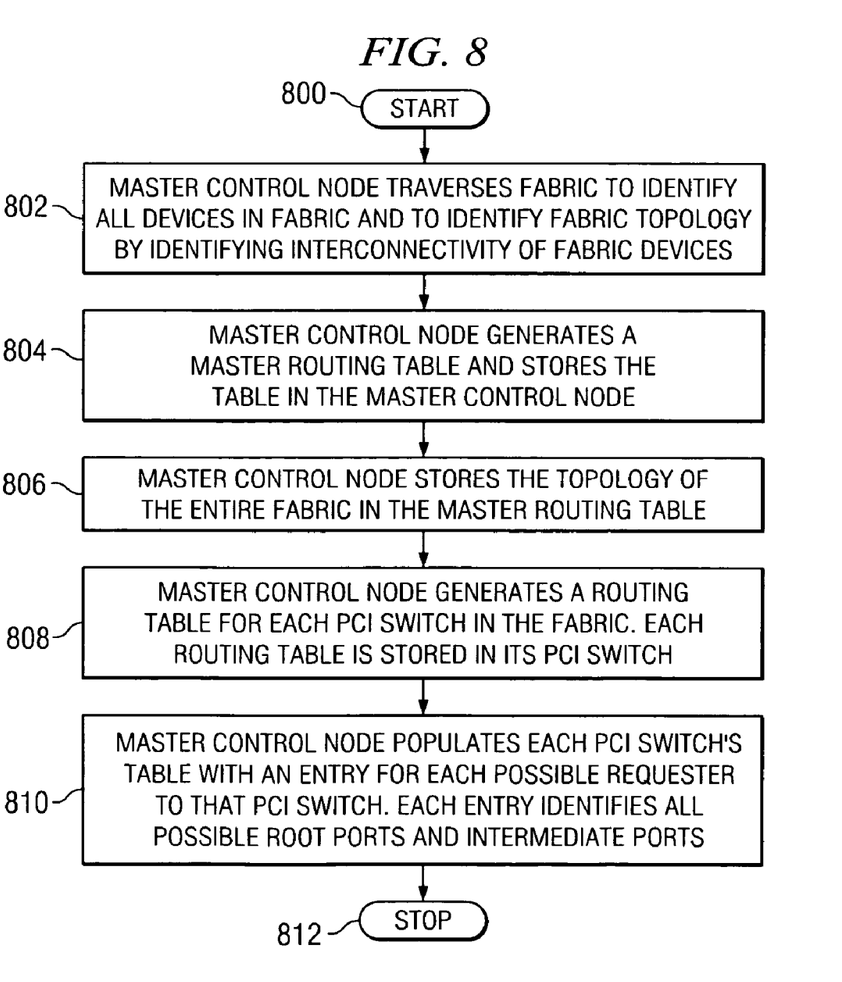
FIG. 8 illustrates a high level flow chart that depicts a master control node generating routing tables and populating those tables with fabric topology in accordance with the illustrative embodiment of the present invention.

FIG. 8 illustrates a high level flow chart that depicts a master control node generating routing tables and populating those tables with fabric topology in accordance with the illustrative embodiment of the present invention. The process starts as depicted by block 800 and thereafter passes to block 802 which illustrates the master control node traversing the fabric to identify all devices in the fabric and to identify the fabric topology. The fabric topology is identified by identifying each device and the interconnectivity of these devices, i.e. how all of the devices are connected to each other. Next, block 804 depicts the master control node generating a master routing table. The master control node then stores the master routing table in the master control node.

The process then passes to block 806 which illustrates the master control node storing the topology of the entire fabric in the master routing table. Block 808, then, depicts the master control node generating a routing table for each PCI switch in the fabric. The master control node then stores each PCI switch's routing table in that PCI switch. Thereafter, block 810 illustrates the master control node populating each PCI switch's table with an entry for each possible requester to that PCI switch. Each entry identifies all possible root ports and intermediate ports. The process then terminates as depicted by block 812.

Figure 9:
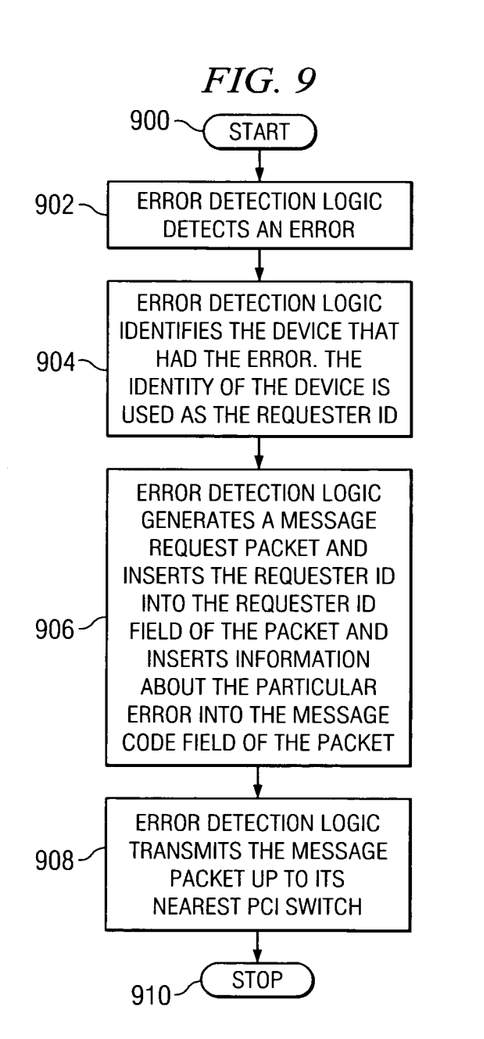
FIG. 9 depicts a high level flow chart that illustrates error detection logic detecting an error and generating and transmitting a message request packet that describes the error in accordance with the illustrative embodiment of the present invention.

FIG. 9 depicts a high level flow chart that illustrates the error detection and control logic detecting an error and generating and transmitting a message request packet that describes the error in accordance with the illustrative embodiment of the present invention. The process starts as depicted by block 900 and thereafter passes to block 902 which illustrates the error detection logic detecting an error. Next, block 904 depicts the error detection logic identifying the device that had the error. The identity of the device is used as the requester identifier (ID) in the message request packet.

Block 906, then, illustrates the error detection logic generating a message request packet. The error detection logic inserts the requester ID into the requester ID field of the packet and inserts the information about this particular error into the message code field of the packet. The information about the error identifies the type of error. Thereafter, block 908 depicts the error detection logic transmitting the message packet to the fabric up to its nearest PCI switch. The process then terminates as illustrated by block 910.

Figure 10:
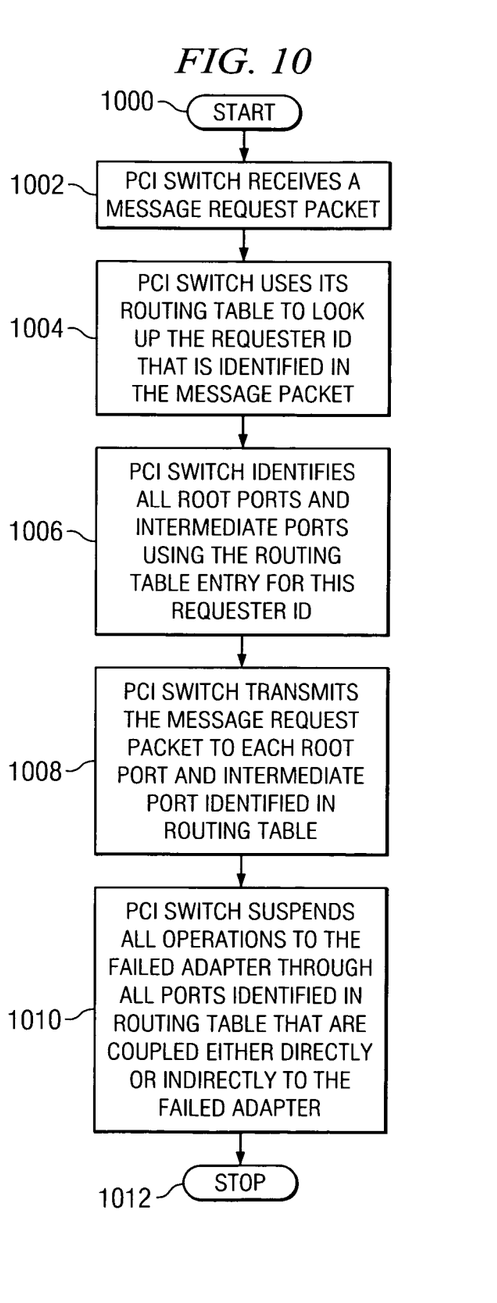
FIG. 10 depicts a high level flow chart that illustrates a PCI switch utilizing its routing table to forward a message request packet and suspend I/O operations through ports coupled to a failed I/O adapter in accordance with the illustrative embodiment of the present invention.

FIG. 10 depicts a high level flow chart that illustrates a PCI switch utilizing its routing table to forward a message request packet and suspend I/O operations through ports coupled to a failed I/O adapter in accordance with the illustrative embodiment of the present invention. The process starts as depicted by block 1000 and thereafter passes to block 1002 which illustrates a PCI switch receiving a message request packet. Next, block 1004 depicts the PCI switch using its internal routing table to look up the requester ID that is identified in the message request packet. The process then passes to block 1006 which illustrates the PCI switch identifying all root ports and intermediate ports using the routing table entry for this requester ID. The entry is located using the requester ID. Once the entry for this requester ID is located, the root and intermediate ports identified in the entry are identified. Block 1008, then, depicts the PCI switch transmitting the message request packet to each root port and each intermediate port identified in the routing table.

Block 1010, then, illustrates the PCI switch suspending all operations to the failed adapter through all ports identified in the routing table that are coupled, either directly or indirectly, to the failed adapter. The process then terminates as depicted by block 1012.

Figure 11:
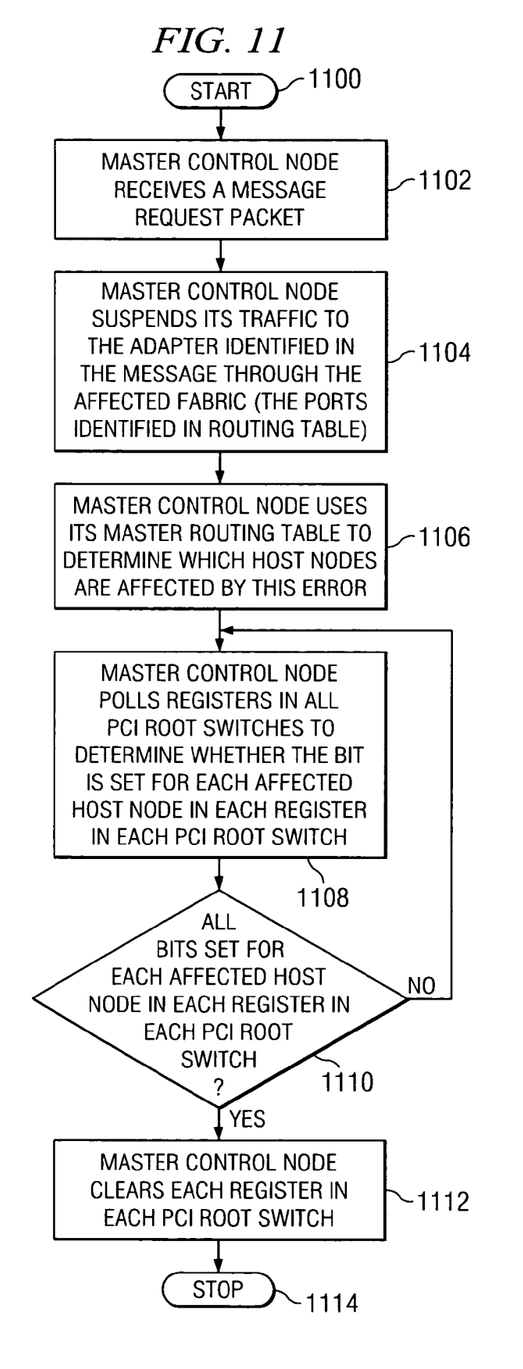
FIG. 11 illustrates a high level flow chart that depicts the master control node waiting until all traffic in the potentially affected paths in the fabric is suspended and all potentially affected host nodes have acknowledged the receipt of a notice that the error occurred before clearing the error in accordance with the illustrative embodiment of the present invention.

FIG. 11 illustrates a high level flow chart that depicts the master control node waiting until all traffic in the potentially affected paths in the fabric is suspended and all potentially affected host nodes have acknowledged the receipt of a notice that the error occurred before clearing the error in accordance with the illustrative embodiment of the present invention. The process starts as depicted by block 1100 and thereafter passes to block 1102 which illustrates the master control node receiving a message request packet. Next, block 1104 depicts the master control node suspending its traffic to the adapter identified in the packet through the affected fabric. The affected fabric includes the ports identified in the master routing table.

The process then passes to block 1106 which illustrates the master control node using its master routing table to determine which host nodes are affected by this error. Next, block 1108 depicts the master control node polling registers in all PCI root switches to determine whether the bit is set for each affected host node in each register in each PCI root switch. Block 1110, then, illustrates a determination of whether or not all bits are set for each affected host node in each register in each PCI root switch. If a determination is made that not all bits are set for each affected host node in each register in each PCI root switch, the process passes back to block 1108. If a determination is made that all bits are set for each affected host node in each register in each PCI root switch, the process passes to block 1112 which depicts the master control node clearing each register in each PCI root switch. The process then terminates as illustrated by block 1114.

Figure 12:
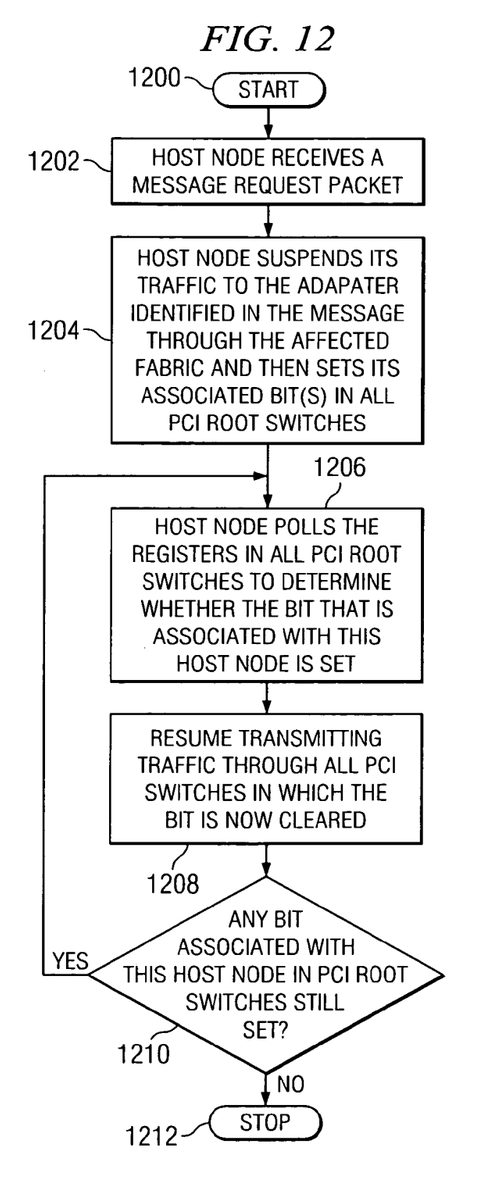
FIG. 12 depicts a high level flow chart that illustrates a host node suspending its traffic through portions of the fabric that are affected by an error until the master control node signals that all affected host nodes have acknowledged the error in accordance with the illustrative embodiment of the present invention.

FIG. 12 depicts a high level flow chart that illustrates a host node suspending its traffic through portions of the fabric that are affected by an error until the master control node signals that all affected host nodes have acknowledged the error in accordance with the illustrative embodiment of the present invention. The process starts as depicted by block 1200 and thereafter passes to block 1202 which illustrates a host node receiving a message request packet. Next, block 1204 depicts the host node suspending its traffic to the adapter identified in the error message through the affected port(s) and setting the bit in the registers in the PCI root switches. This is the bit that is associated with this particular host node.

The process then passes to block 1206 which illustrates the host node polling the registers in all PCI root switches to determine whether the bit that is associated with this host node is set in the register in this PCI root switch. Next, block 1208 depicts resuming transmitting traffic through all PCI switches in which the bit is now cleared. Thereafter, block 1210 illustrates a determination of whether or not any bit associated with this host node in a register in any one of the PCI root switches is still set. If a determination is made that there is at least one bit still set in the register in one of the PCI root switches, the process passes back to block 1206. If a determination is made that all of the bits are cleared in all the PCI root switches, the process terminates as depicted by block 1212.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain or store the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk —read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the illustrative embodiment of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method in a data processing environment that includes a plurality of host computer systems that are coupled to a plurality of I/O adapters utilizing a switched fabric for routing an error message to only ones of said plurality of host computer systems that are affected by an error identified by said error message, said computer-implemented method comprising:

detecting, by one of said plurality of I/O adapters, an error in said one of said plurality of adapters;

generating, by said one of said plurality of I/O adapters, an error message that includes specific information about said error and includes an identifier that identifies said one of said plurality of I/O adapters;

utilizing routing tables that are stored only in hardware switches in said fabric that are connected directly to at least one of said plurality of host computer systems to identify ones of said plurality of host computer systems that are affected by said error; and routing, by said hardware switches that are connected to said at least one of said plurality of host computer systems, said error message to only said identified ones of said host computer systems.

2. The computer-implemented method according to claim 1, further comprising:

routing said error message to a single master control computer system, which is included in said plurality of host computer systems, that identifies said ones of said plurality of host computer systems.

3. The computer-implemented method according to claim 1, further comprising:

routing said error message to a single master control computer system, which is included in said plurality of host computer systems;

waiting, by said master control computer system, until all of said identified ones of said host computer systems have acknowledged a receipt of said error message before clearing said error; and suspending transmitting traffic to said one of said plurality of adapters until said error is cleared.

4. The computer-implemented method according to claim 1, further comprising:

receiving, by a first one of said identified ones of said host computer systems, said error message;

acknowledging, by said first one of said identified ones of said host computer systems, said receipt of said error message;

suspending, by said first one of said identified ones of said host computer systems, transmitting traffic from said first one to said one of said plurality of adapters; and waiting, by said first one, until said error is cleared before resuming transmitting traffic to said one of said plurality of adapters.

5. The computer-implemented method according to claim 1, further comprising:

including a register only in said hardware switches;

allocating a different bit in said register to each one of said plurality of host computer systems;

in response to said error message, suspending transmitting traffic to said one of said plurality of adapters;

receiving, by said identified ones of said plurality of host computer systems, said error message;

acknowledging, by each one of said identified ones of said host computer systems, said receipt of said error message by setting a bit in said register that is allocated to a respective one of said identified ones of said host computer systems;

polling, by a master control computer system, which is included in said plurality of host computer systems, said register to determine whether all of said identified ones of said plurality of host computer systems have acknowledged a receipt of said error message;

in response to a determination by said master control computer system that all of said identified ones of said plurality of host computer systems have acknowledged a receipt of said error message, clearing, by said master control computer system, said error by clearing all bits in said register to permit said identified ones of said plurality of host computer systems to resume transmitting traffic to said one of said plurality of adapters; and in response to a determination by said master control computer system that not all of said identified ones of said plurality of host computer systems have acknowledged a receipt of said error message, waiting, by said master control computer system, to clear said error, wherein traffic to said one of said plurality of adapters remains suspended.

6. The computer-implemented method according to claim 1, further comprising:

traversing, by a master control computer system, said fabric to identify a topology that includes an identification of all of said hardware switches and an interconnectivity of said hardware switches, said plurality of host computer systems, and said plurality of adapters; and storing said topology in said master control computer system.

7. The computer-implemented method according to claim 1, further comprising:

determining, for one of said hardware switches, a device topology that identifies all of said hardware switches that are connected to said one of said hardware switches; and storing said device topology in a routing table included in said one of said hardware switches.

8. An apparatus in a data processing environment that includes a plurality of host computer systems that are coupled to a plurality of adapters utilizing a switched fabric for routing an error message to only ones of said plurality of host computer systems that are affected by an error identified by said error message, said apparatus comprising:

one of said plurality of I/O adapters detecting an error in said one of said plurality of adapters:

said one of said plurality of I/O adapters generating an error message that includes specific information about said error and includes an identifier that identifies said one of said plurality of I/O adapters:

routing tables that are stored only in hardware switches in said fabric that are connected directly to at least one of said plurality of host computer systems for identifying ones of said plurality of host computer systems that are affected by an error that occurred in one of said plurality of adapters that are included within said environment; and said hardware switches that are connected to said at least one of said plurality of host computer systems routing said error message to only said identified ones of said host computer systems.

9. The apparatus according to claim 8, further comprising:

a single master control computer system, which is included in said plurality of host computer systems, that identifies said ones of said plurality of host computer systems; and said error message being routed to said master control computer system.

10. The apparatus according to claim 8, further comprising:

a single master control computer system, which is included in said plurality of host computer systems;

said error message being routed to said master control computer system;

said master control computer system waiting until all of said identified ones of said host computer systems have acknowledged a receipt of said error message before clearing said error; and traffic being suspended to said one of said plurality of adapters until said error is cleared.

11. The apparatus according to claim 8, further comprising:
a first one of said identified ones of said host computer systems receiving said error message;
said first one of said identified ones of said host computer systems acknowledging said receipt of said error message;
said first one of said identified ones of said host computer systems suspending transmitting traffic from said first one to said one of said plurality of adapters; and
said first one waiting until said error is cleared before resuming transmitting traffic to said one of said plurality of adapters.

12. The apparatus according to claim 8, further comprising:
a register included only in said hardware switches;
a different bit in said register allocated to each one of said plurality of host computer systems;
in response to said error message, traffic being suspended to said one of said plurality of adapters;
said identified ones of said plurality of host computer systems receiving said error message;
each one of said identified ones of said host computer systems acknowledging said receipt of said error message by setting a bit in said register that is allocated to a respective one of said identified ones of said host computer systems;
a master control computer system, which is included in said plurality of host computer systems, polling said register to determine whether all of said identified ones of said plurality of host computer systems have acknowledged a receipt of said error message;
in response to a determination by said master control computer system that all of said identified ones of said plurality of host computer systems have acknowledged a receipt of said error message, said master control computer system clearing said error by clearing bits in said register to permit said identified ones of said plurality of host computer systems to resume transmitting traffic to said one of said plurality of adapters; and
in response to a determination by said master control computer system that not all of said identified ones of said plurality of host computer systems have acknowledged a receipt of said error message, said master control computer system waiting to clear said error, wherein traffic to said one of said plurality of adapters remains suspended.

13. The apparatus according to claim 8, further comprising:
a master control computer system traversing said fabric to identify a topology that includes an identification of all of said hardware switches and an interconnectivity of said hardware switches, said plurality of host computer systems, and said plurality of adapters; and
said master control computer system for storing said topology.

14. The apparatus according to claim 8, further comprising:
a device topology determined, for one of said hardware switches, that identifies all of said hardware switches that are connected to said one of said hardware switches; and
a routing table included in said one of said hardware switches for storing said device topology.

15. A computer program product that is stored in a computer usable medium comprising:
the computer usable medium including computer usable program code for routing an error message to only ones of a plurality of host computer systems that are affected by an error identified by an error message, said plurality of host computer systems coupled to a plurality of adapters utilizing a switched fabric, said computer program product including;
computer usable program code for detecting by one of said plurality of I/O adapters, an error in said one of said plurality of adapters that are included within said environment;
computer usable program code for generating, by said one of said plurality of I/O adapters, an error message that includes specific information about said error and includes an identifier that identifies said one of said plurality of I/O adapters;
computer usable program code for utilizing routing tables that are stored only in hardware switches in said fabric that are connected directly to at least one of said plurality of host computer systems to identify ones of said plurality of host computer systems that are affected by said error; and
computer usable program code for routing, by said hardware switches that are connected to said at least one of said plurality of host computer systems, said error message to only said identified ones of said host computer systems.

16. The computer program product according to claim 15, further comprising:
computer usable program code for routing said error message to a single master control computer system, which is included in said plurality of host computer systems;
computer usable program code for waiting, by said master control computer system, until all of said identified ones of said host computer systems have acknowledged a receipt of said error message before clearing said error; and
computer usable program code for suspending transmitting traffic to said one of said plurality of adapters until said error is cleared.

17. The computer program product according to claim 15, further comprising:
computer usable program code for receiving, by a first one of said identified ones of said host computer systems, said error message;
computer usable program code for acknowledging, by said first one of said identified ones of said host computer systems, said receipt of said error message;
computer usable program code for suspending, by said first one of said identified ones of said host computer systems, transmitting traffic from said first one to said one of said plurality of adapters; and
computer usable program code for waiting, by said first one, until said error is cleared before resuming transmitting traffic to said one of said plurality of adapters.

18. The computer program product according to claim 15, further comprising:
including a register only in said hardware switches;
computer usable program code for allocating a different bit in said register to each one of said plurality of host computer systems;
in response to said error message, computer usable program code for suspending transmitting traffic to said one of said plurality of adapters;

computer usable program code for receiving, by a first one of said identified ones of said plurality of host computer systems, said error message;

computer usable program code for acknowledging, by each one of said identified ones of said host computer systems, said receipt of said error message by setting a bit in said register that is allocated to a respective one of said identified ones of said host computer systems;

computer usable program code for polling, by a master control computer system, which is included in said plurality of host computer systems, said register to determine whether all of said identified ones of said plurality of host computer systems have acknowledged a receipt of said error message;

in response to a determination by said master control computer system that all of said identified ones of said plurality of host computer systems have acknowledged a receipt of said error message, computer usable program code for clearing, by said master control computer system, said error by clearing all bits in said register to permit said identified ones of said plurality of host computer systems to resume transmitting traffic to said one of said plurality of adapters; and in response to a determination by said master control computer system that not all of said identified ones of said plurality of host computer systems have acknowledged a receipt of said error message, computer usable program code for waiting, by said master control computer system, to clear said error wherein traffic to said one of said plurality of adapters remains suspended.

\* \* \* \* \*